(12) United States Patent
Suzuki et al.

(10) Patent No.: US 11,840,230 B2
(45) Date of Patent: Dec. 12, 2023

(54) CONTROL APPARATUS AND CONTROL METHOD

(71) Applicant: HONDA MOTOR CO., LTD., Tokyo (JP)

(72) Inventors: Noriaki Suzuki, Wako (JP); Yosuke Mizutani, Wako (JP); Kohei Maruyama, Wako (JP); Shinya Kobayashi, Wako (JP); Shunpei Matsumura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 344 days.

(21) Appl. No.: 17/211,002

(22) Filed: Mar. 24, 2021

(65) Prior Publication Data
US 2021/0206375 A1    Jul. 8, 2021

Related U.S. Application Data

(63) Continuation of application No. PCT/JP2018/036441, filed on Sep. 28, 2018.

(51) Int. Cl.
*B60W 30/18*    (2012.01)
*B60L 15/20*    (2006.01)

(52) U.S. Cl.
CPC ... *B60W 30/18109* (2013.01); *B60L 15/2009* (2013.01); *B60W 30/18118* (2013.01); *B60W 30/18181* (2013.01); *B60W 2540/10* (2013.01)

(58) Field of Classification Search
None
See application file for complete search history.

(56) References Cited

U.S. PATENT DOCUMENTS

2017/0361851 A1    12/2017    Takeya et al.

FOREIGN PATENT DOCUMENTS

| CN | 107206980 A | 9/2017 |
|---|---|---|
| JP | 7-251711 A | 10/1995 |
| JP | 2003-146117 A | 5/2003 |
| JP | 2006-335314 A | 12/2006 |
| JP | 2007-69729 A | 3/2007 |
| JP | 2015-6831 A | 1/2015 |
| JP | 2016-111759 A | 6/2016 |
| JP | 2017-47746 A | 3/2017 |
| JP | 2017-63535 A | 3/2017 |

(Continued)

OTHER PUBLICATIONS

Sato et al., JP 2003-146117 A (machine-generated English translation), Mar. 9, 2017, p. 1-25. (Year: 2017).*

(Continued)

*Primary Examiner* — Todd Melton
(74) *Attorney, Agent, or Firm* — WHDA, LLP

(57) ABSTRACT

A control apparatus for controlling a vehicle includes a travel controlling unit for executing a one-pedal function for controlling both a driving force and a braking force of the vehicle according to an operation amount of an accelerator pedal, and an output controlling unit capable of displaying, on a display device of the vehicle, a first indicator indicating that the one-pedal function is enabled and a second indicator indicating that a stopped state of the vehicle is being held by a braking force of the one-pedal function.

10 Claims, 11 Drawing Sheets

(56) References Cited

FOREIGN PATENT DOCUMENTS

WO  2017/081714 A1  5/2017

OTHER PUBLICATIONS

Tahara et al., JP 2015-006831 A (machine-generated English translation), Jan. 15, 2015, p. 1-43. (Year: 2015).*
Takeya et al., JP 2017-047746 A (machine-generated English translation), May 21, 2003, p. 1-36. (Year: 2003).*
International Search Report w/English translation and Written Opinion in Japanese dated Jan. 8, 2019, issued in counterpart International Application No. PCT/JP2018/036441. (11 pages).
Office Action dated May 31, 2023, issued in counterpart CN application No. 201880097799.7, with English translation. (14 pages).

* cited by examiner

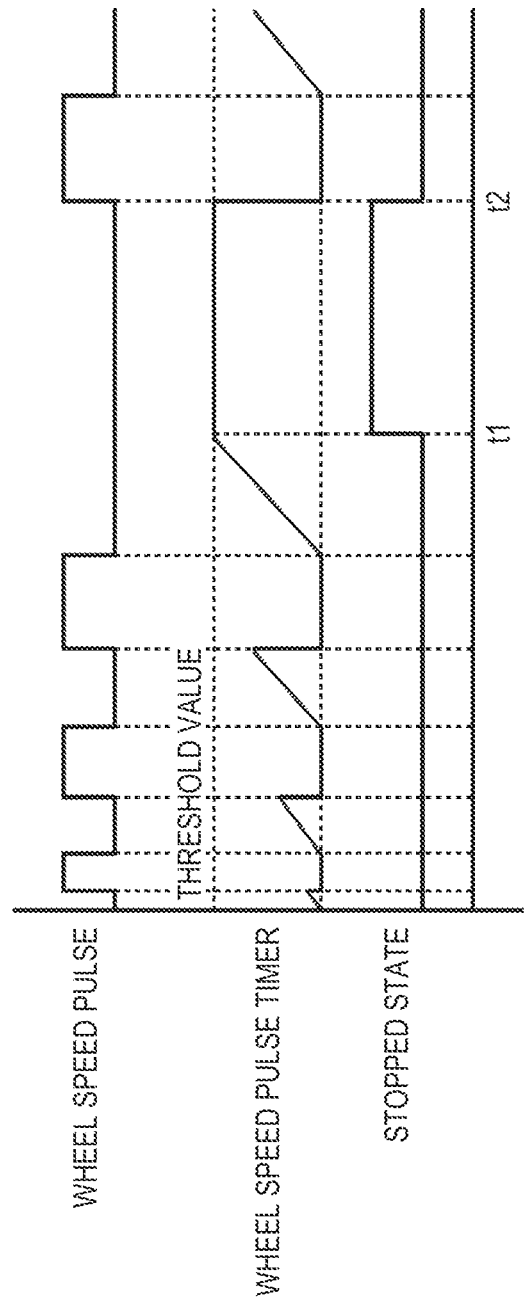

CONTROL APPARATUS AND CONTROL METHOD

CROSS-REFERENCE TO RELATED APPLICATION(S)

This application is a continuation of International Patent Application No. PCT/JP2018/036441 filed on Sep. 28, 2018, the entire disclosure of which is incorporated herein by reference.

BACKGROUND OF THE INVENTION

Field of the Invention

The present invention relates to a control apparatus and a control method.

Description of the Related Art

Japanese Patent Laid-Open No. 2016-111759 proposes a one-pedal function for controlling both the driving force and braking force of a vehicle according to the amount by which the accelerator pedal of the vehicle is operated. Japanese Patent Laid-Open No. 2006-335314 proposes an auto brake hold function for holding the stopped state of a vehicle in the case where the vehicle has stopped, regardless of the amount by which the brake pedal is operated.

SUMMARY OF THE INVENTION

In a state in which the one-pedal function is enabled, the stopped state of the vehicle is held by the braking force of the one-pedal function. In this state, the driver is not pressing the brake pedal, and may thus feel anxious about whether stop hold is being performed. An aspect of the present disclosure is to notify the state of a vehicle in an intelligible manner. According to an embodiment, a control apparatus for controlling a vehicle includes a travel controlling unit for executing a one-pedal function for controlling both a driving force and a braking force of the vehicle according to an operation amount of an accelerator pedal, and an output controlling unit capable of displaying, on a display device of the vehicle, a first indicator indicating that the one-pedal function is enabled and a second indicator indicating that a stopped state of the vehicle is being held by a braking force of the one-pedal function.

Further features of the present invention will become apparent from the following description of exemplary embodiments with reference to the attached drawings.

BRIEF DESCRIPTION OF THE DRAWINGS

FIG. 11 is a timing chart illustrating a stop determination operation according to an embodiment of the present invention.

DESCRIPTION OF THE EMBODIMENTS

Embodiments of the present invention will be described below, with reference to the attached drawings. The same reference signs will be given to similar elements throughout the various embodiments, and redundant description will be omitted. Also, the embodiments may be modified and combined as appropriate.

An example configuration of a vehicle 100 according to some embodiments of the present invention will be described, with reference to FIG. 1. The vehicle 100 is a vehicle (so-called hybrid car) whose driving force derives from both fossil fuel and electricity. The vehicle 100 may be a vehicle (so-called petrol engine car or diesel engine car) whose driving force is derived from only fossil fuel, a vehicle (so-called electric car) whose driving force is derived from only electricity, or a vehicle (so-called fuel cell vehicle) whose driving force is derived from hydrogen.

Figure 1:
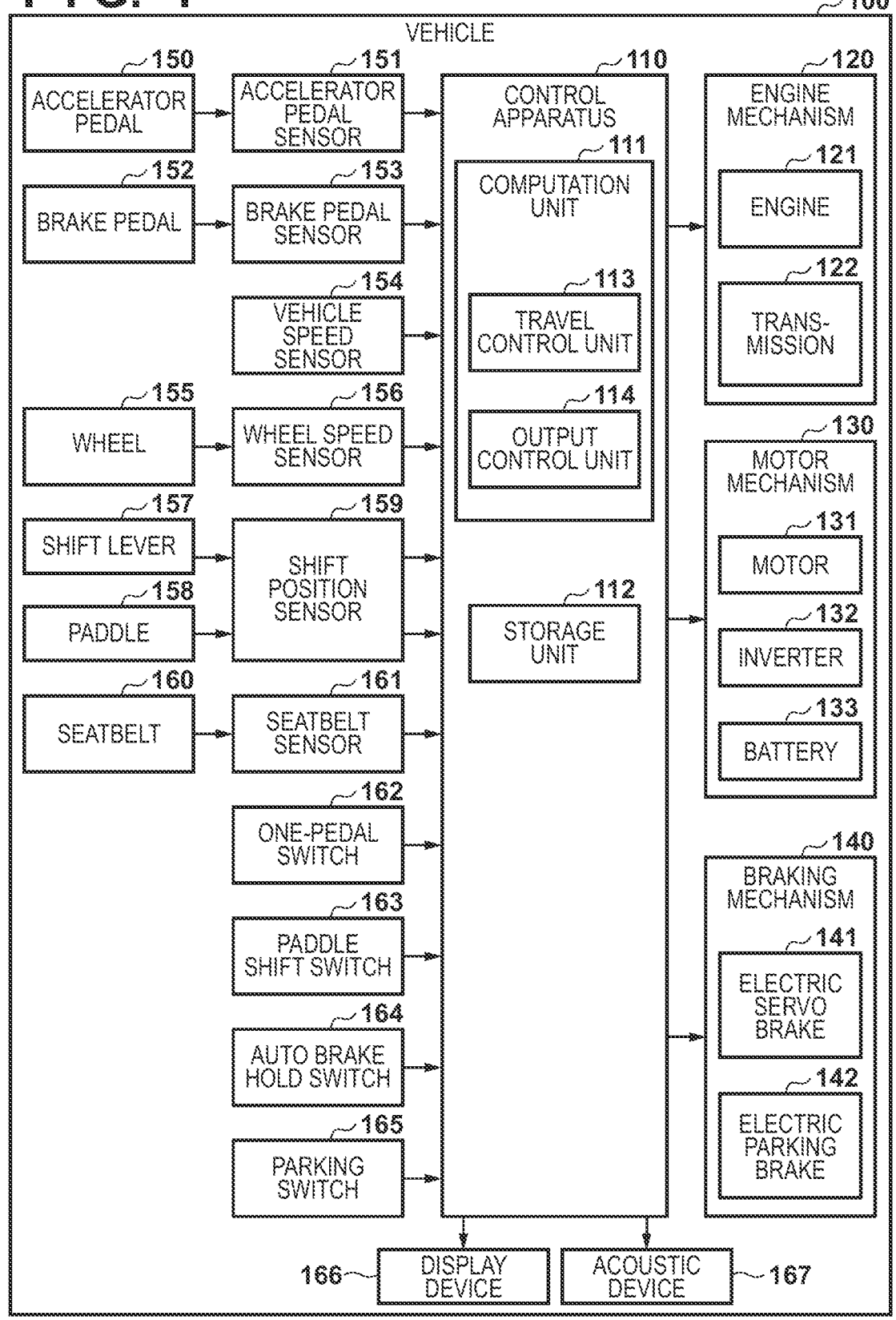
FIG. 1 is a block diagram illustrating an example configuration of a vehicle according to an embodiment of the present invention.

The vehicle 100 has the constituent elements shown in FIG. 1. FIG. 1 mainly shows the constituent elements that will be used in describing the embodiments, and other constituent elements (e.g., vehicle body, suspension, etc.) of the vehicle 100 have been omitted. A control apparatus 110 controls the vehicle 100. The control apparatus 110 may be constituted as a general-purpose computer having a computation unit 111 and a storage unit 112. The computation unit 111 performs processing for controlling the vehicle 100. The computation unit 111 is constituted by a processor, for example. The storage unit 112 stores programs and data that are used in processing by the computation unit 111. The storage unit 112 is constituted by a volatile memory such as RAM (Random Access Memory) and a nonvolatile memory such as ROM (Read Only Memory), for example.

The computation unit 111 includes a travel control unit 113 and an output control unit 114, for example. The travel control unit 113 performs control relating to driving and braking of the vehicle 100. The output control unit 114 performs control relating to output of information to the driver. Operations by the travel control unit 113 and the output control unit 114 are performed, by the computation unit 111 executing programs stored in the storage unit 112. The control apparatus 110 may be constituted by a dedicated integrated circuit (e.g., ASIC), instead of being constituted by a general-purpose computer. In this case, the travel control unit 113 and the output control unit 114 may be constituted by separate integrated circuits.

The control apparatus 110 can also be referred to as an ECU (Electronic Control Unit). The control apparatus 110 may be constituted by one ECU or may be constituted by a plurality of ECUs. In the case where the control apparatus 110 is constituted by a plurality of ECUs, these ECUs are disposed in various places within the vehicle, and communicate with each other through an in-vehicle network such as CAN (Controller Area Network).

An engine mechanism 120 provides driving force to the vehicle 100 with a fossil fuel (e.g., gasoline) as the energy source. The engine mechanism 120 includes an engine 121 and a transmission 122. The engine 121 is the driving source of the vehicle 100, and is controlled by the travel control unit 113. The transmission 122 is a Continuously Variable Transmission (CVT), for example. Alternatively, other transmissions may be used. The travel control unit 113 is capable of operating an engine brake, by controlling the engine mechanism 120.

A motor mechanism 130 provides driving force to the vehicle 100 with electricity as the energy source. The motor mechanism 130 includes a motor 131, an inverter 132, and a battery 133. The inverter 132 controls output of the motor 131. The battery 133 stores electric energy and supplies the electric energy to the motor 131 via the inverter 132. The travel control unit 113 is capable of operating a regenerative brake, by controlling the motor mechanism 130.

A braking mechanism 140 provides braking force to the vehicle 100. The braking mechanism 140 includes an electric servo brake 141 and an electric parking brake 142. The electric servo brake 141 is a brake that blends a motorized regenerative brake with a hydraulic friction brake, and provides braking force that depends on the amount by which a brake pedal 152 is operated to the vehicle 100. The electric parking brake 142 provides stop hold braking force that is not dependent on the operation amount of the brake pedal 152 to the rear wheels of the vehicle 100.

An accelerator pedal 150 is a pedal for receiving driving force control from the driver. An accelerator pedal sensor 151 detects the amount by which the accelerator pedal 150 is pressed down (hereinafter, AP operation amount), and supplies the detected AP operation amount to the control apparatus 110. The travel control unit 113 controls the engine mechanism 120 and the motor mechanism 130 to provide driving force that depends on the AP operation amount to the vehicle 100.

The brake pedal 152 is a pedal for receiving braking force control from the driver. A brake pedal sensor 153 detects the amount by which the brake pedal 152 is pressed down (hereinafter, BP operation amount), and supplies the detected BP operation amount to the control apparatus 110. The travel control unit 113 controls the electric servo brake 141 to provide braking force that depends on the BP operation amount to the vehicle 100.

A vehicle speed sensor 154 detects the speed of the vehicle 100, and supplies the detected speed to the control apparatus 110. A wheel speed sensor 156 detects the revolution speed of a wheel 155, and supplies the detected speed to the control apparatus 110. A shift position sensor 159 detects the position of a shift lever 157, and supplies the detected position to the control apparatus 110. Also, the shift position sensor 159 detects input performed using a paddle 158, and supplies the detected input to the control apparatus 110. Note that the paddle is provided in the steering periphery, for example. Input performed using the paddle 158 includes a downshift instruction and an upshift instruction. A seatbelt state sensor 161 detects a worn situation of a seatbelt 160, and supplies the detected worn situation to the control apparatus 110.

The travel control unit 113 may be capable of executing a one-pedal function. The one-pedal function is a function for controlling both the driving force and braking force of the vehicle 100 according to the AP operation amount. With the one-pedal function, the travel control unit 113 may hold the stopped state of the vehicle 100 regardless of the BP operation amount after stopping. For example, the travel control unit 113 provides braking force that depends on the AP operation amount to the vehicle 100 when the AP operation amount is in a 0 to 30% range, and provides driving force that depends on the AP operation amount to the vehicle 100 when the AP operation amount is in a 30 to 100% range. The AP operation amount at the boundary between braking force and driving force can beset in a 20 to 40% range, for example. The travel control unit 113 may change this boundary value according to the vehicle speed.

The effectiveness of the braking force that depends on the AP operation amount is settable over a plurality of levels through the shift lever 157 or the paddle 158. For example, the effectiveness of the braking force is settable over stages from level 0 (braking force zero) to an upper limit level. The settable upper limit level can change depending on variables such as the residual amount of the battery 133, the temperature of the battery 133, the temperature of the brake pads, the number of revolutions of the engine 121 and the number of revolutions of the transmission 122. The maximum value of the upper limit level is level 6. The travel control unit 113 may not only change the effectiveness setting of the braking force according to instructions from the driver but may also change this setting automatically regardless of instructions from the driver.

A one-pedal switch 162 is a switch for the driver to switch the one-pedal function between enabled and disabled. This switch may be constituted by a physical button or may be constituted by a virtual button displayed on a touch panel. The one-pedal switch 162 is disposed in an instrument panel, for example.

The travel control unit 113 may be capable of executing a paddle shift function in a state where the one-pedal function is disabled. The paddle shift function is a function for changing the effectiveness of the braking force of the vehicle 100 when the AP operation amount is less than or equal to travel resistance according to instructions from the driver through the shift lever 157 or the paddle 158. The effectiveness of the braking force is changed by changing the gear ratio of the transmission 122, adjusting the regeneration amount of the motor mechanism 130, adjusting the amount of engine brake, and adjusting the pressure applied to the brake pads, for example.

The effectiveness of the braking force when the paddle shift function is enabled is settable over a plurality of levels through the paddle 158. For example, the effectiveness of the braking force is settable over stages from level 0 (braking force zero) to an upper limit level. The settable upper limit level can change depending on variables such as the charge situation of the battery 133. The maximum value of the upper limit level is level 4. The travel control unit 113 may not only change the effectiveness setting of the braking force according to instructions from the driver but may also change this setting automatically regardless of instructions from the driver.

A paddle shift switch 163 is a switch for the driver to switch the paddle shift function between enabled and disabled. This switch may be constituted by a physical button or may be constituted by a virtual button displayed on a touch panel. The paddle shift switch 163 is disposed in the instrument panel, for example.

The travel control unit 113 is capable of executing an auto brake hold function. The auto brake hold function is a function for holding the stopped state of the vehicle 100, in the case where the brake pedal 152 is pressed down and the vehicle 100 stops, regardless of the subsequent amount of BP operation (even if the driver takes his or her foot off the brake pedal 152). If the auto brake hold function is enabled, the stopped state of the vehicle 100 is held even when the driver takes his or her foot off the brake pedal 152 while the vehicle 100 is stopped. This stopped state is released by the driver pressing the accelerator pedal 150 and the AP operation amount becomes a positive value.

An auto brake hold switch 164 is a switch for the driver to switch the auto brake hold function between enabled and disabled. This switch may be constituted by a physical button or may be constituted by a virtual button displayed on a touch panel. The auto brake hold switch 164 is disposed in the instrument panel, for example.

A parking switch 165 is a switch for the driver to instruct starting and ending of operation of the electric parking brake 142. This switch may be constituted by a physical button or may be constituted by a virtual button displayed on a touch panel. The parking switch 165 is disposed in the instrument panel, for example.

The travel control unit 113 executes the auto brake hold function and the one-pedal function exclusively. That is, the auto brake hold function and the one-pedal function will not both be enabled at the same time. Also, the travel control unit 113 executes the paddle shift function and the one-pedal function exclusively. That is, the paddle shift function and the one-pedal function will not both be enabled at the same time.

A display device 166 is a device for presenting visual information to the driver. The display device 166 is constituted by a liquid crystal display, an LED, a meter or the like, for example. An acoustic device 167 is a device for presenting auditory information to the driver. The acoustic device 167 is constituted by a speaker, for example. The display device 166 and the acoustic device 167 are disposed in the instrument panel, for example. In this specification, notification to the driver includes notification using only visual information, notification using only auditory information, and notification using both visual information and auditory information. For example, in the case of notifying a message to the driver, the output control unit 114 may display the message on the display device 166 as visual information, may play back the message with the acoustic device 167 as auditory information, or may perform both.

Figure 2:
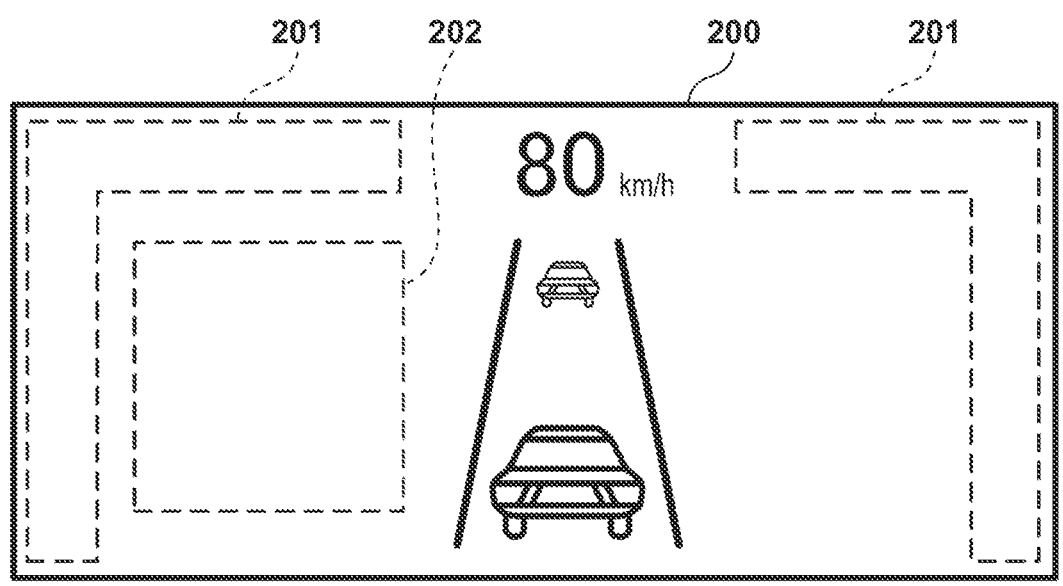
FIG. 2 is a schematic diagram illustrating an example configuration of a screen according to an embodiment of the present invention.

An example of a screen 200 that is displayed on the display device 166 will be described with reference to FIG. 2. The screen 200 includes an indicator display area 201 and a message display area 202. Various indicators relating to the state of the vehicle are displayed in the indicator display area 201. Messages to the driver are displayed in the message display area 202. In the example shown in FIG. 2, the indicator display area 201 is disposed on both the left and right sides along the edge of the screen 200.

Examples of indicators that are displayable on the display device 166 by the output control unit 114 will be described, with reference to FIGS. 3A to 3E. Areas 301, 304 and 307 in FIGS. 3A to 3E are each an area for displaying one indicator, and occupy part of the indicator display area 201. The area 301 and the area 304 may be adjacent to each other. Here, two areas being adjacent means that area for displaying other indicators do not exist between the two areas.

Figure 3A:
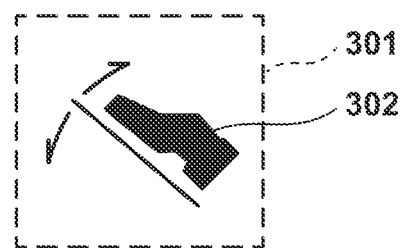
FIG. 3A is a diagram illustrating an example display of an indicator according to an embodiment of the present invention.

A one-pedal indicator 302 shown in FIG. 3A is an indicator indicating that the one-pedal function is enabled. The one-pedal indicator 302 is disposed in the area 301. The one-pedal indicator 302 is displayed when the one-pedal function is enabled, and is not displayed when the one-pedal function is disabled.

Figure 3B:
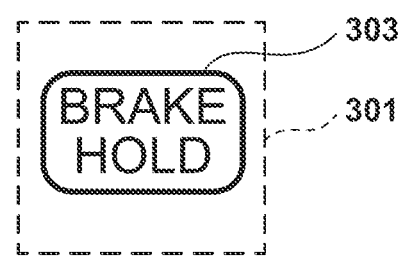
FIG. 3B is a diagram illustrating an example display of an indicator according to an embodiment of the present invention.

An auto brake hold indicator 303 shown in FIG. 3B is an indicator indicating that the auto brake hold function is enabled. The auto brake hold indicator 303 is disposed in the area 301. The auto brake hold indicator 303 is displayed when the auto brake hold function is enabled, and is not displayed when the auto brake hold function is disabled.

Because the auto brake hold function and the one-pedal function are executed exclusively, the output control unit 114 is able to exclusively display the one-pedal indicator 302 and the auto brake hold indicator 303 in the same area 301 of the display device 166. The screen 200 can be effectively utilized by exclusively displaying indicators in this way.

Figure 3C:
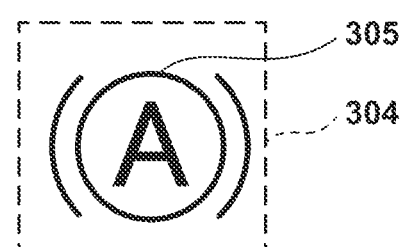
FIG. 3C is a diagram illustrating an example display of an indicator according to an embodiment of the present invention.

A stop hold indicator 305 shown in FIG. 3C is an indicator indicating that the stopped state of the vehicle 100 is being held by the braking force of the one-pedal function. The stop hold indicator 305 is disposed in the area 304. The stop hold indicator 305 is displayed when stop hold is being performed, and is not displayed when stop hold is not being performed. There are also times, however, when the stop hold indicator 305 is not displayed even when stop hold is being performed.

Figure 3D:
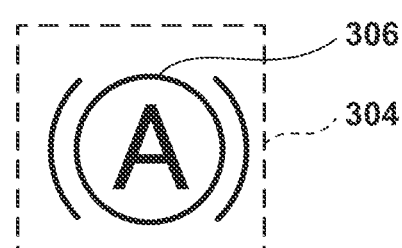
FIG. 3D is a diagram illustrating an example display of an indicator according to an embodiment of the present invention.

A stop hold indicator 306 shown in FIG. 3D is an indicator indicating that the stopped state of the vehicle 100 is being held by the auto brake hold function. The stop hold indicator 306 is disposed in the area 304. The stop hold indicator 306 is displayed when stop hold is being performed, and is not displayed when stop hold is not being performed.

Because the auto brake hold function and the one-pedal function are executed exclusively, the output control unit 114 is able to exclusively display the stop hold indicator 305 and the stop hold indicator 306 in the same area 304 of the display device 166. The screen 200 can be effectively utilized by exclusively displaying indicators in this way. Also, the same mark is used for the stop hold indicator 305 and the stop hold indicator 306. Even though the functions that result in display of these indicators differ from each other, the vehicle 100 being a state where stop hold is being performed is the same, and thus using the same mark makes it easier for the driver to grasp the state of the vehicle 100.

Figure 3E:
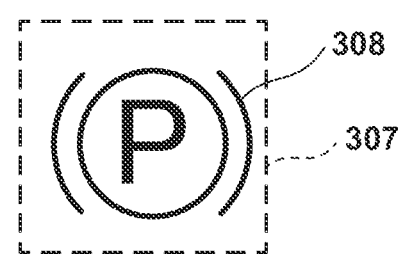
FIG. 3E is a diagram illustrating an example display of an indicator according to an embodiment of the present invention.

A parking indicator 308 shown in FIG. 3E is an indicator indicating that operation of the electric parking brake 142 has been completed. The parking indicator 308 is disposed in the area 307. The parking indicator 308 is displayed when operation of the electric parking brake 142 has been completed, and is not displayed when operation of the electric parking brake 142 has not been completed.

Figure 4:
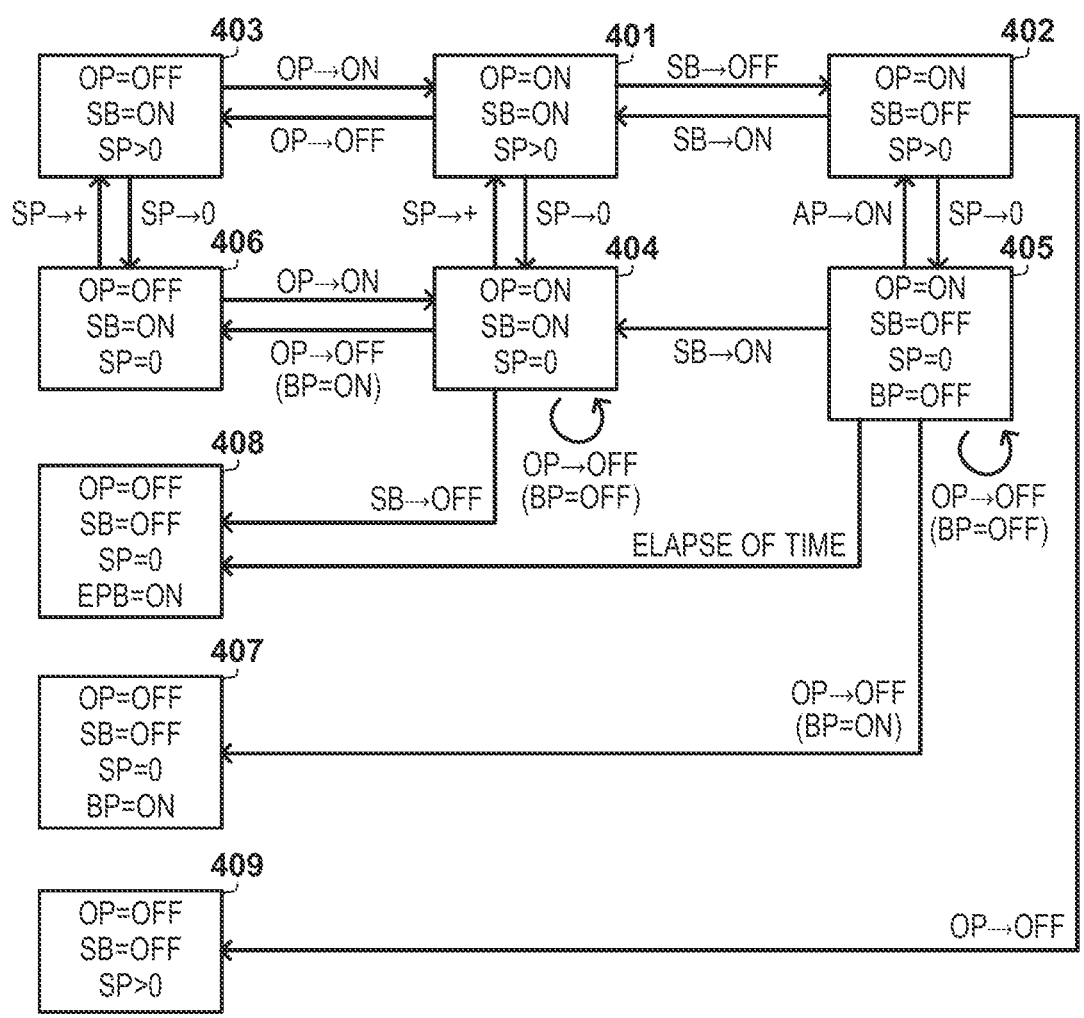
FIG. 4 is a state transition diagram illustrating operations of a control apparatus according to an embodiment of the present invention.

An example of control of the one-pedal function by the control apparatus 110 will be described, with reference to FIG. 4. In the states shown in FIG. 4, "OP" indicates the state of the one-pedal function. "SB" indicates the worn state of the seatbelt 160. "AP" indicates the operation state of the accelerator pedal 150. "BP" indicates the operation state of the brake pedal 152. "EPB" indicates the operation state of the electric parking brake 142. "SP" indicates the vehicle speed. "ON" indicates that the corresponding item is enabled, is being worn, is operating, or operation thereof has been completed. "OFF" indicates that the corresponding item is disabled, is not being worn, is not operating, or operation thereof has not been completed. In the states shown in FIG. 4, "EPB=OFF" (operation of the electric parking brake 142 has not been completed), unless stated otherwise. Also, unless stated otherwise, the operation amounts of the accelerator pedal 150 and the brake pedal 152 can take arbitrary values.

First, each state will be described. In state 401, the one-pedal function is enabled, the seatbelt 160 is being worn, and the vehicle speed is positive (i.e., the vehicle 100 is currently traveling). In state 401, the output control unit 114 displays the one-pedal indicator 302, and does not display the stop hold indicator 305.

In state 402, the one-pedal function is enabled, the seatbelt 160 is unfastened, and the vehicle speed is positive. In state 402, the output control unit 114 displays the one-pedal indicator 302, and does not display the stop hold indicator 305. Furthermore, the output control unit 114 notifies an instruction to fasten the seatbelt 160 to the driver. This notification is performed by displaying a message in the message display area 202, for example.

In state 403, the one-pedal function is disabled, the seatbelt 160 is being worn, and the vehicle speed is positive. Instate 403, the output control unit 114 does not display the one-pedal indicator 302 or the stop hold indicator 305.

In state 404, the one-pedal function is enabled, the seatbelt 160 is being worn, and the vehicle speed is zero (i.e., the vehicle 100 is in a stopped state). In this state, the stopped state of the vehicle 100 is held by the braking force of the one-pedal function, even when the BP operation amount is zero. In state 404, the output control unit 114 displays the one-pedal indicator 302 and the stop hold indicator 305.

In state 405, the one-pedal function is enabled, the seatbelt 160 is unfastened, the vehicle speed is zero, and the BP operation amount is zero. In this state, the stopped state of the vehicle 100 is temporarily held by the braking force of the one-pedal function, even when the BP operation amount is zero. In state 405, the output control unit 114 displays the one-pedal indicator 302, and does not display the stop hold indicator 305. Because the seatbelt 160 is unfastened, there is a possibility that the driver may get out of the vehicle 100. There is a risk that the vehicle may start to move when the stop holding power weaken in a state where the driver is absent. In view of this, the output control unit 114 prompts the driver to operate the brake pedal 152 by not displaying the stop hold indicator 305, and inhibits the driver from getting out of the vehicle before operation of the electric parking brake 142 has been completed.

Furthermore, the output control unit 114 may notify an instruction to press the brake pedal 152 to the driver. This notification is performed by displaying a message in the message display area 202, for example. At the same time, the output control unit 114 may play back a warning sound from the acoustic device 167. Due to this notification, the driver can be inhibited from getting out of the vehicle 100.

In state 406, the one-pedal function is disabled, the seatbelt 160 is being worn, and the vehicle speed is zero. In this state, the stopped state of the vehicle 100 is held by braking force due to operation of the brake pedal 152. In state 406, the output control unit 114 does not display the one-pedal indicator 302 or the stop hold indicator 305.

In state 407, the one-pedal function is disabled, the seatbelt 160 is unfastened, the vehicle speed is zero, and the brake pedal 152 is being pressed. In this state, the stopped state of the vehicle 100 is held by braking force due to operation of the brake pedal 152. In state 407, the output control unit 114 does not display the one-pedal indicator 302 or the stop hold indicator 305.

In state 408, the one-pedal function is disabled, the seatbelt 160 is unfastened, the vehicle speed is zero, and operation of the electric parking brake 142 has been completed. In this state, the stopped state of the vehicle 100 is held by the stop hold braking force of the electric parking brake 142. In state 408, the output control unit 114 displays the parking indicator 308, and does not display the one-pedal indicator 302 or the stop hold indicator 305.

In state 409, the one-pedal function is disabled, the seatbelt 160 is unfastened, and the vehicle speed is positive. In state 409, the output control unit 114 does not display the one-pedal indicator 302 or the stop hold indicator 305.

Next, state transition will be described. Instate 401, the travel control unit 113 transitions to state 402, if the seatbelt 160 has been unfastened. Due to this transition, the output control unit 114 continues to display the one-pedal indicator 302. Furthermore, the output control unit 114 notifies an instruction to fasten the seatbelt 160.

In state 401, the travel control unit 113 transitions to state 403, if an instruction to disable the one-pedal function is received. In response to this transition, the output control unit 114 ends display of the one-pedal indicator 302. The travel control unit 113 may impose predetermined conditions on this transition. For example, the travel control unit 113 may perform this transition, if the instruction to disable the one-pedal function is received in a state where the BP operation amount is positive, and may otherwise remain in state 401.

In state 401, the travel control unit 113 transitions to state 404, if the vehicle speed has become zero. In response to this transition, the output control unit 114 displays the stop hold indicator 305.

Instate 402, the travel control unit 113 transitions to state 409, if an instruction to disable the one-pedal function is received from the driver. In response to this transition, the output control unit 114 ends display of the one-pedal indicator 302. The travel control unit 113 may impose predetermined conditions on this transition. For example, the travel control unit 113 may perform this transition, if the instruction to disable the one-pedal function is received in a state where the BP operation amount is positive, and may otherwise remain in state 402.

In state 402, the travel control unit 113 transitions to state 401, if the seatbelt 160 has been fastened. Due to this transition, the output control unit 114 continues to display the one-pedal indicator 302. Furthermore, the output control unit 114 ends notification of the instruction to fasten the seatbelt 160.

In state 402, the travel control unit 113 transitions to state 405, if the vehicle speed has become zero. Due to this transition, the output control unit 114 continues to display the one-pedal indicator 302, and continues to not display the stop hold indicator 305. Furthermore, the output control unit 114 may notify an instruction to press the brake pedal 152 to the driver.

In state 403, the travel control unit 113 transitions to state 401, if an instruction to enable the one-pedal function is received from the driver. In response to this transition, the output control unit 114 displays the one-pedal indicator 302. In state 403, the travel control unit 113 transitions to state 406, if the vehicle speed has become zero. Indicator display does not change due to this transition.

Instate 404, the travel control unit 113 remains instate 404, if an instruction to disable the one-pedal function is received from the driver without the brake pedal 152 being pressed, in order to prevent the vehicle suddenly moving off. In this case, the output control unit 114 may notify the driver that the brake pedal 152 needs to be pressed in order to disable the one-pedal function. In state 404, the travel control unit 113 transitions to state 406, if an instruction to disable the one-pedal function is received in a state where the brake pedal is being pressed. Furthermore, the output control unit 114 may notify the driver that the one-pedal function has been disabled.

In state 404, the travel control unit 113 starts transition to state 408, if the seatbelt 160 has been unfastened. In response to starting this transition, the travel control unit 113 starts operation of the electric parking brake 142, and transitions to state 408 in response to this operation being completed. Due to this transition, the travel control unit 113 disables the one-pedal function. In response, the output control unit 114 displays the parking indicator 308, and ends display of the one-pedal indicator 302. Furthermore, the output control unit 114 may notify the driver that the one-pedal function has been disabled. In response to starting this transition, the output control unit 114 ends display of the stop hold indicator 305. The reason for not display the stop hold indicator 305 is as described above in relation to state 405.

In state 404, the travel control unit 113 transitions to state 401, if the vehicle speed has become positive. In response to this transition, the output control unit 114 ends display of the stop hold indicator 305.

Instate 405, the travel control unit 113 remains instate 405, if an instruction to disable the one-pedal function is received from the driver without the brake pedal 152 being pressed, in order to prevent the vehicle suddenly moving off. In this case, the output control unit 114 may notify the driver that the brake pedal 152 needs to be pressed in order to disable the one-pedal function. In state 405, the travel control unit 113 transitions to state 407, if an instruction to disable the one-pedal function is received in a state where the brake pedal is being pressed. Furthermore, the output control unit 114 may notify the driver that the one-pedal function has been disabled.

In state 405, the travel control unit 113 transitions to state 404, if the seatbelt 160 has been fastened. Due to this transition, the output control unit 114 continues to display the one-pedal indicator 302, and displays the stop hold indicator 305. Furthermore, the output control unit 114 ends notification of the instruction to fasten the seatbelt 160.

Instate 405, the travel control unit 113 transitions to state 402, if the AP operation amount has become positive. Due to this transition, the travel control unit 113 ends display of the stop hold indicator 305.

Instate 405, the travel control unit 113 starts operation of the electric parking brake 142 after a predetermined time (e.g., 3 seconds) has elapsed since transitioning to state 405, and transitions to state 408 in response to this operation being completed. Due to this transition, the travel control unit 113 disables the one-pedal function. In response, the output control unit 114 displays the parking indicator 308, ends display of the one-pedal indicator 302, and continues to not display the stop hold indicator 305. Furthermore, the output control unit 114 may end notification of the instruction to press the brake pedal 152, and notify the driver that the one-pedal function has been disabled. By starting operation of the electric parking brake 142 after waiting for a predetermined time to elapse, the vehicle 100 can be inhibited from spinning out particularly on low p roads. Furthermore, the travel control unit 113 may gradually raise the intensity of the electric parking brake 142, after starting operation of the electric parking brake 142. The vehicle 100 can thereby be further inhibited from spinning out particularly on low p roads.

Instate 406, the travel control unit 113 transitions to state 404, if an instruction to enable the one-pedal function is received from the driver. In response to this transition, the output control unit 114 displays the one-pedal indicator 302 and the stop hold indicator 305. In state 406, the travel control unit 113 transitions to state 403, if the vehicle speed has become positive. Indicator display does not change due to this transition.

An example of processing by the control apparatus 110 will be described, with reference to FIGS. 5 to 7. In these diagrams, "one-pedal function" indicates the state of the one-pedal function. The one-pedal function is enabled when high level, and the one-pedal function is disabled when low level. "Vehicle speed" indicates the speed of the vehicle 100. "Seatbelt" indicates the worn state of the seatbelt 160. The seatbelt 160 is being worn when high level, and the seatbelt 160 is unfastened when low level. "Electric parking brake" indicates the stop hold braking force that is applied by the electric parking brake 142. "AP operation amount" indicates the amount by which the accelerator pedal 150 is operated. "BP operation amount" indicates the amount by which the brake pedal 152 is operated. "One-pedal indicator" indicates the state of the one-pedal indicator 302. The one-pedal indicator 302 is displayed when high level, and the one-pedal indicator 302 is not displayed when low level. "Stop hold indicator" indicates the state of the stop hold indicator 305. The stop hold indicator 305 is displayed when high level, and the stop hold indicator 305 is not displayed when low level. "Message display" indicates the message that is displayed in the message display area 202. A message is displayed when high level, and a message is not displayed when low level. "Warning sound" indicates the playback state of a warning sound. A warning sound is played back when high level, and a warning sound is not played back when low level.

Figure 5:
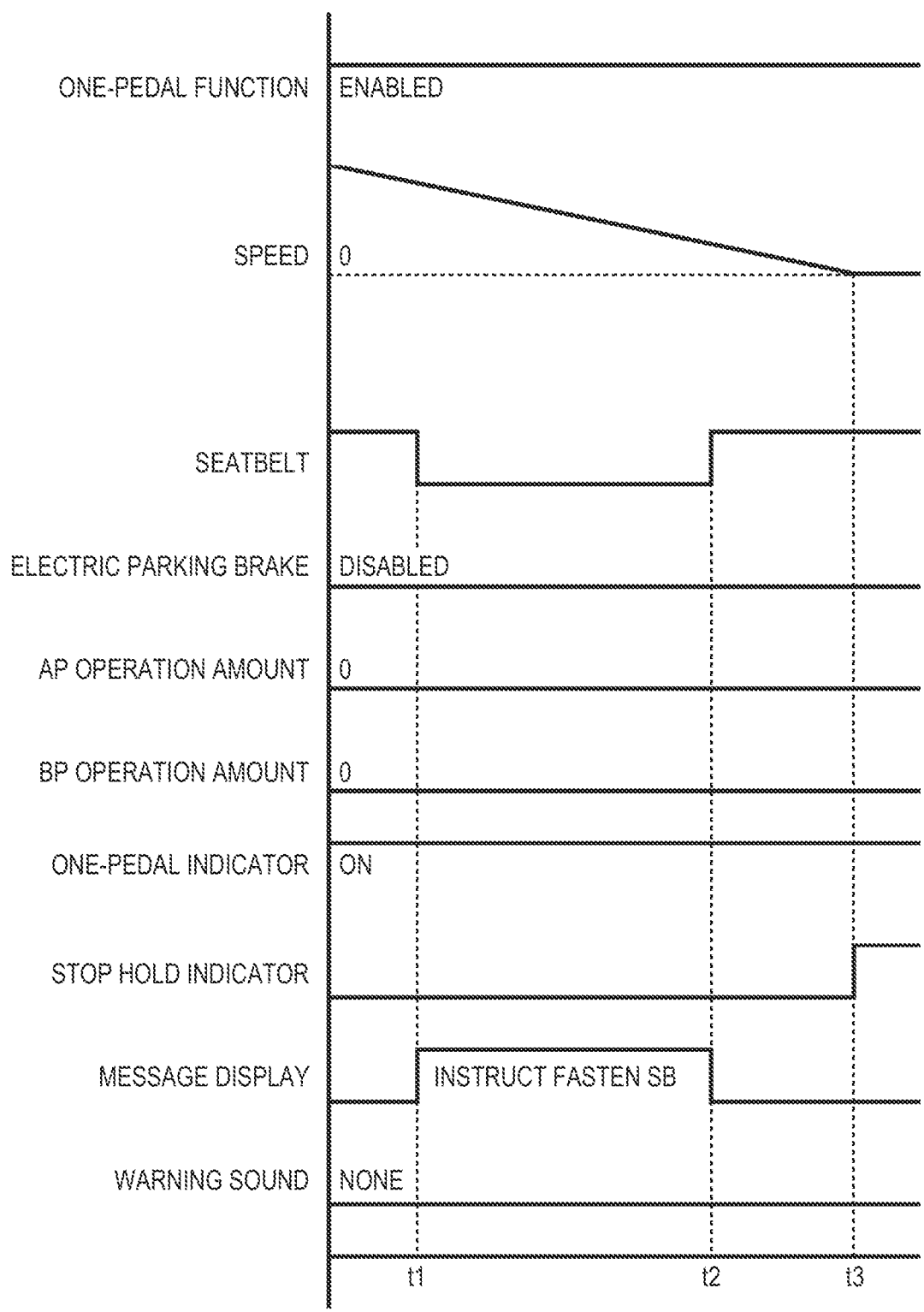
FIG. 5 is a timing chart illustrating operations of a control apparatus according to an embodiment of the present invention.

At the start time of the example in FIG. 5, and the control apparatus 110 is in state 401. At time t1, the control apparatus 110 transitions to state 402, in response to the seatbelt 160 being unfastened. In response to this transition, the output control unit 114 notifies an instruction to fasten the seatbelt 160 to the driver.

At time t2, the control apparatus 110 transitions to state 401, in response to the seatbelt 160 being fastened. In response to this transition, the output control unit 114 ends notification of the instruction to fasten the seatbelt 160.

At time t3, the control apparatus 110 transitions to state 404, in response to the vehicle speed having become zero. In response to this transition, the output control unit 114 displays the stop hold indicator 305.

Figure 6:
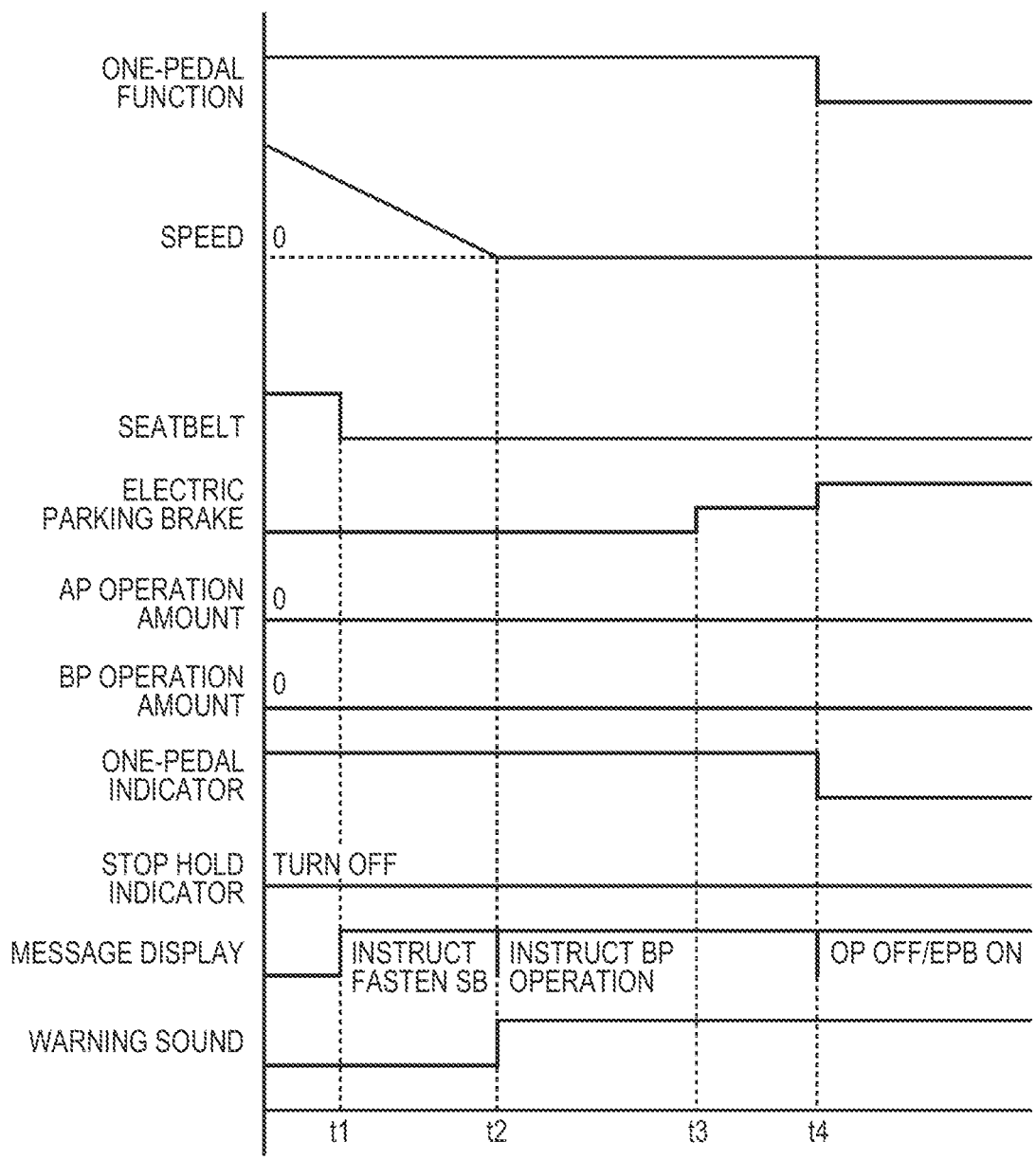
FIG. 6 is a timing chart illustrating operations of a control apparatus according to an embodiment of the present invention.

At the start time of the example in FIG. 6, the control apparatus 110 is in state 401. The operation at time t1 is similar to the operation at time t1 of the example in FIG. 5. In response to the vehicle speed having become zero at time t2, the control apparatus 110 transitions to state 405. In response to this transition, the output control unit 114 ends notification of the instruction to fasten the seatbelt 160, and notifies an instruction to press the brake pedal 152 to the driver.

At time t3 after a predetermined time has elapsed from time t2, the travel control unit 113 starts operation of the electric parking brake 142. The travel control unit 113 inhibits the vehicle 100 from spinning out particularly on low μ roads, by gradually raising the intensity of the stop hold braking force of operation of the electric parking brake 142.

At time t4, the travel control unit 113 transitions to state 408 when operation of the electric parking brake 142 is completed. In response to this transition, the travel control unit 113 disables the one-pedal function. Also, the output control unit 114 ends display of the one-pedal indicator 302, and notifies the driver that the one-pedal function has been disabled and that operation of the electric parking brake 142 has been completed.

Figure 7:
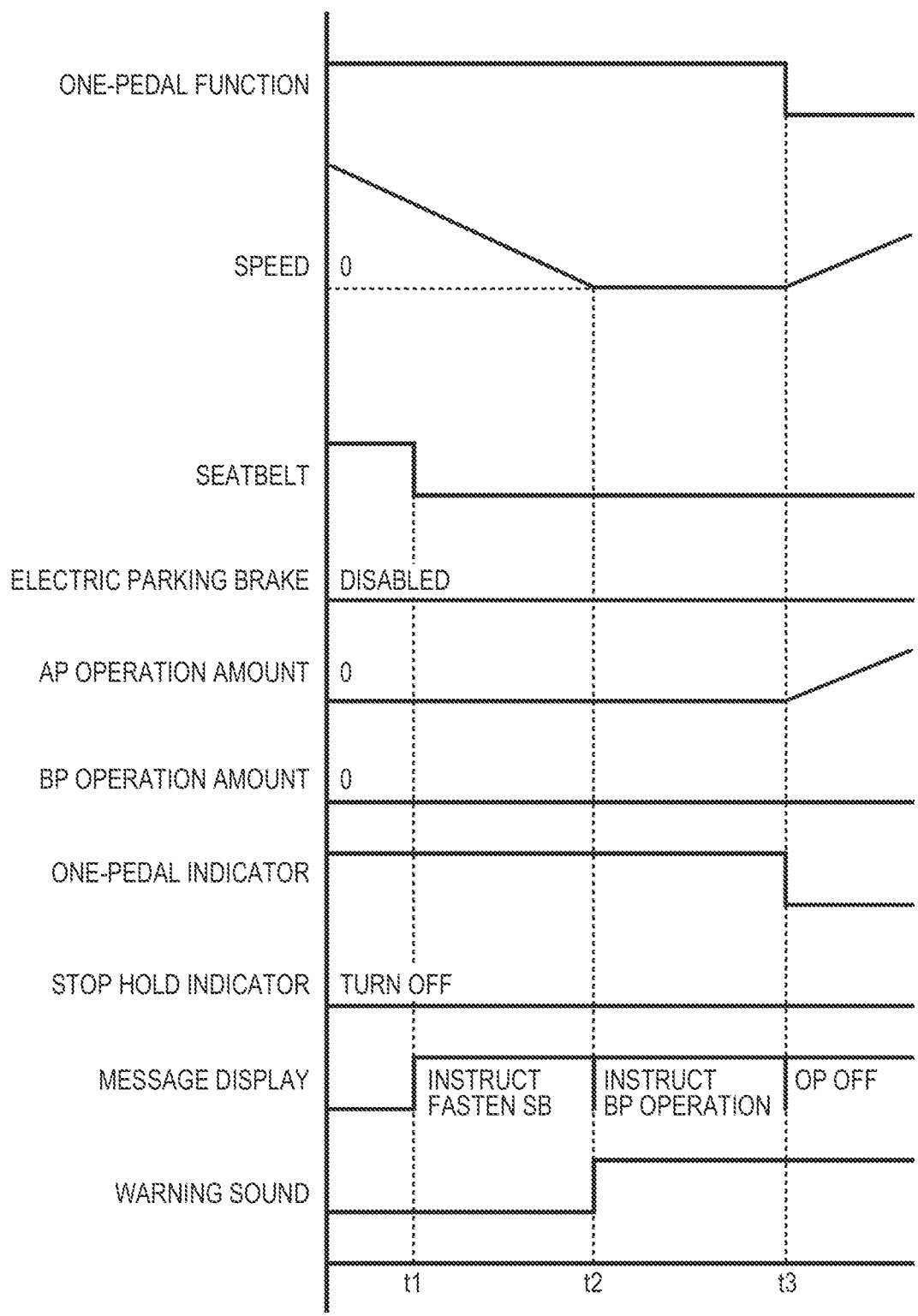
FIG. 7 is a timing chart illustrating operations of a control apparatus according to an embodiment of the present invention.

The example in FIG. 7 up to time t2 is similar to the example in FIG. 6 up to time t2. At time t3, the control apparatus 110 transitions to state 409, in response to the accelerator pedal 150 being pressed. In response to this transition, the travel control unit 113 disables the one-pedal function. Also, the output control unit 114 ends display of the one-pedal indicator 302, and notifies the driver that the one-pedal function has been disabled.

Figure 8:
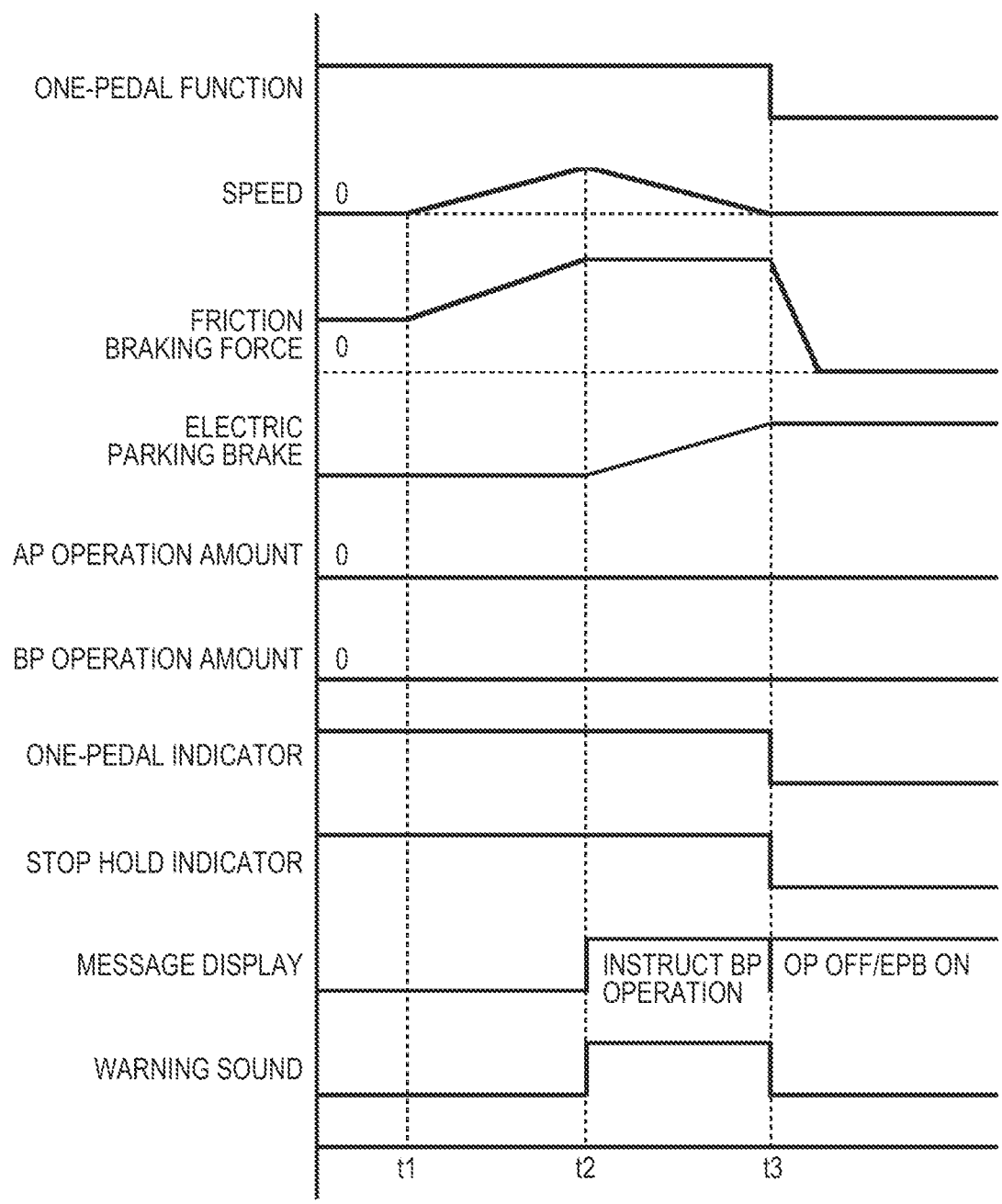
FIG. 8 is a timing chart illustrating operations of a control apparatus according to an embodiment of the present invention.
Figure 9:
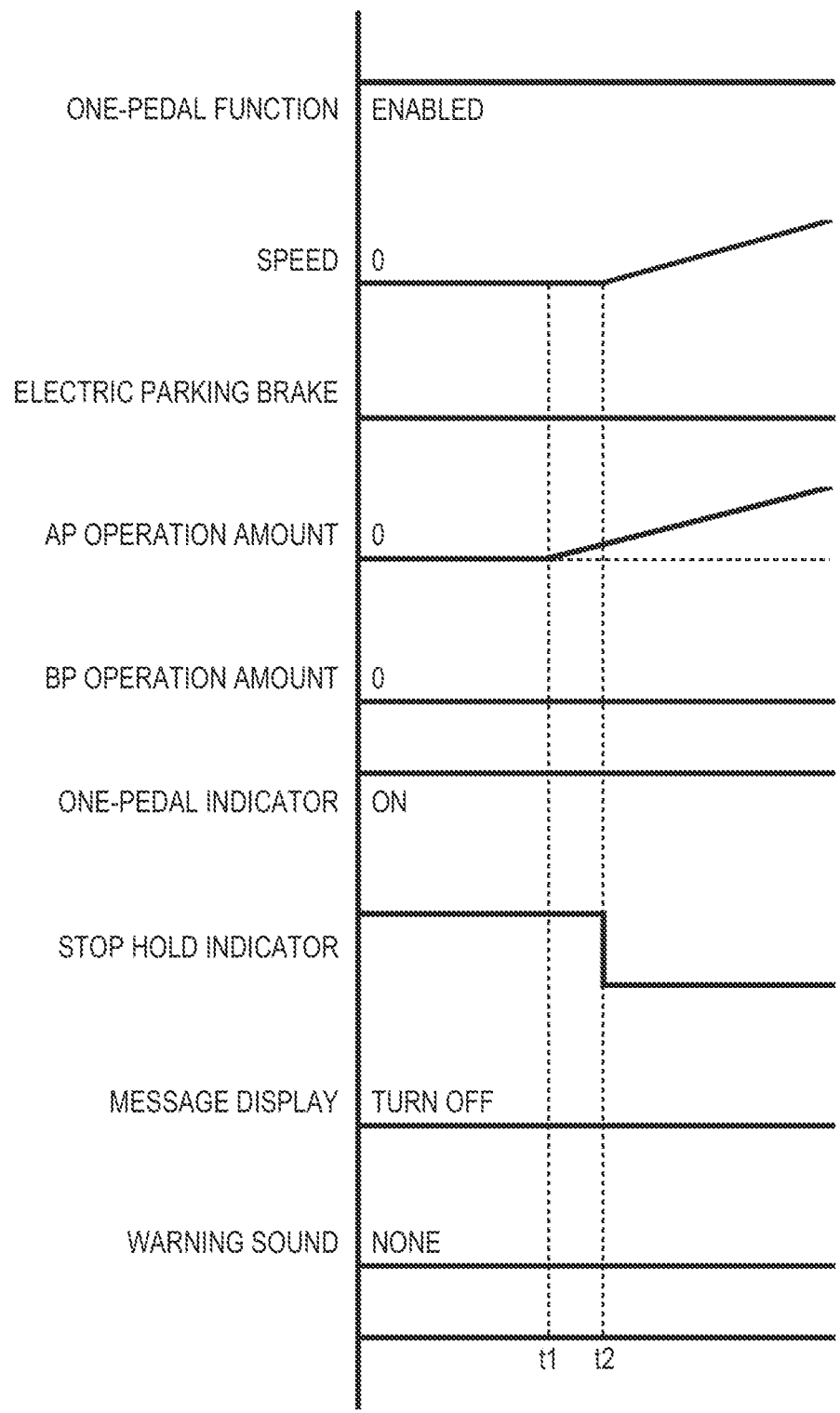
FIG. 9 is a timing chart illustrating operations of a control apparatus according to an embodiment of the present invention.
Figure 10:
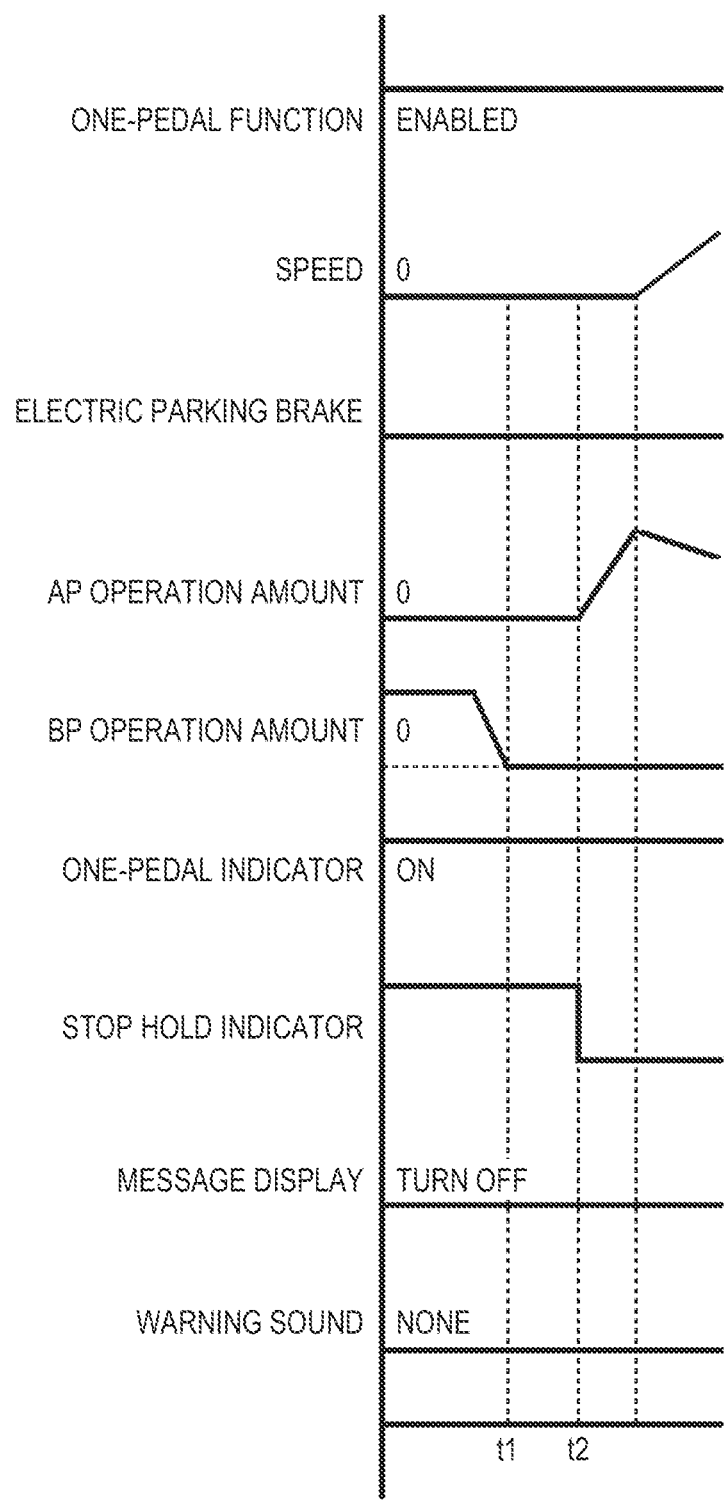
FIG. 10 is a timing chart illustrating operations of a control apparatus according to an embodiment of the present invention.

In the abovementioned FIGS. 5 to 7, an example is addressed in which the stopped state of the vehicle 100 can be held by the braking force of the one-pedal function. In FIGS. 8 to 10, an example is addressed in which the stopped state of the vehicle 100 cannot be held by the braking force of the one-pedal function. In FIGS. 8 to 10, the seatbelt 160 is assumed to be fastened.

FIG. 8 illustrates an example in which the braking force drops due to a drop in performance of the one-pedal function, and cannot hold the stopped state of the vehicle 100. In FIG. 8, "braking force" indicates the braking force that the travel control unit 113 seeks to apply to the vehicle 100. Because the one-pedal function drops in performance, the braking force that the vehicle 100 actually receives is lower than the braking force that the travel control unit 113 seeks to apply to the vehicle 100.

At the start time of the example in FIG. 8, and the control apparatus 110 is in state 404. At time t1, the one-pedal function drops in performance, and the braking force that the vehicle 100 actually receives decreases. In response, the vehicle 100 start moving (speed becomes positive). The travel control unit 113 raises the braking force to be applied to the vehicle 100, in order to stop the vehicle 100.

At time t2, when the braking force that the travel control unit 113 seeks to apply to the vehicle 100 reaches a predetermined value, the travel control unit 113 stops increasing the braking force, and starts operation of the electric parking brake 142. Along with this, the output control unit 114 notifies an instruction to press the brake pedal to the driver. This notification is performed by playing back a warning sound along with displaying a message in the message display area 202 of the display device 166, for example.

At time t3, the travel control unit 113 disables the one-pedal function when operation of the electric parking brake 142 is completed. In response, the output control unit 114 ends display of the one-pedal indicator 302 and the stop hold indicator 305, and displays the parking indicator 308. Furthermore, the output control unit 114 notifies the driver that the one-pedal function has been disabled and that operation of the electric parking brake 142 has been completed. This notification is performed by displaying a message in the message display area 202 of the display device 166, for example. Because the one-pedal function is disabled, the travel control unit 113 sets the braking force of the one-pedal function to zero.

The examples in FIG. 9 and FIG. 10 illustrate the case where the control apparatus 110 is in state 404 and the vehicle 100 is stopped on a downslope at the start time. FIG. 9 is a case where the downslope on which the vehicle 100 is stopped is a gentle downslope, and stop hold of the vehicle 100 can be performed with only the braking force of the one-pedal function without pressing the brake pedal 152. FIG. 10 is a case where the downslope on which the vehicle 100 is stopped is a downslope steeper than a threshold value (e.g., 25%), and the driver has further pressed the brake pedal 152 to increase the braking force of the one-pedal function when the vehicle 100 is stopped. Note that the one-pedal function has a function in which the braking force is maintained in an increased state until the accelerator pedal 150 is pressed, even when the driver has taken his or her foot off the brake pedal 152 after having pressed the brake pedal 152 to increase the braking force.

In FIG. 9, the driver starts pressing the accelerator pedal 150 at time t1. At time t2, the travel control unit 113 estimates that the braking force and propulsive force based on gravity of the vehicle 100 are balanced. At this point in time or slightly therebefore, the output control unit 114 ends display of the stop hold indicator 305. Since display of the stop hold indicator 305 ends simultaneously with the vehicle 100 starting to move when on a downslope, the driver feels no sense of incongruity. Note that, in consideration of sensor error in this case, the output control unit 114 may end display of the stop hold indicator 305 slightly before the point in time that the travel control unit 113 calculates that balance will be achieved.

FIG. 10 illustrates an example in which the vehicle is stopped on a downslope steeper than a threshold value (e.g., 25%) and in which the vehicle 100 is stopped in a state where the braking force of the one-pedal function has increased due to the driver having further pressed the brake pedal 152. The driver stops pressing the brake pedal 152 at time t1, and starts pressing the accelerator pedal 150 at time t2. At the point of time t2, the output control unit 114 ends display of the stop hold indicator 305. A state where the vehicle 100 starts moving while the stop hold indicator 305 is on, during the judgment processing by the travel control unit 113 as to whether the stop hold state is being maintained can thereby be inhibited, and the driver's sense of security can be enhanced.

A method by which the travel control unit 113 determines the vehicle 100 is stopped will be described, with reference to FIG. 11. The travel control unit 113 may determine that the vehicle 100 is stopped based on the detection result of the wheel speed sensor 156 of the vehicle 100. In FIG. 12, "wheel speed pulse" indicates a pulse signal that switches between high and low according to the rotation of the wheel 155. "Wheel speed pulse timer" indicates the elapse of time after the wheel speed pulse has fallen. "Stopped state" indicates that the vehicle 100 is in a stopped state, which is a stopped state when high level, and not a stopped state when low level.

From the start to time t1, the wheel speed pulse oscillates. A wheel speed pulse timer measures the time for which the wheel speed pulse has not risen, and the value is reset at the point in time at which the wheel speed pulse rises. At time t1, the travel control unit 113 determines that the vehicle 100 is in a stopped state when the value of the wheel speed pulse timer reaches a threshold value. At time t2, the travel control unit 113 determines that the vehicle 100 is no longer in a stopped state when the wheel speed pulse rises again and the value of the wheel speed pulse timer is reset.

SUMMARY OF EMBODIMENTS

Configuration 1

A control apparatus (110) for controlling a vehicle (100), characterized by including:

travel controlling means (113) for executing a one-pedal function for controlling both a driving force and a braking force of the vehicle according to an operation amount of an accelerator pedal (150); and output controlling means (114) capable of displaying, on a display device (166) of the vehicle, a first indicator (302) indicating that the one-pedal function is enabled and a second indicator (305) indicating that a stopped state of the vehicle is being held by a braking force of the one-pedal function.

According to this configuration, the state of the vehicle at the time of the one-pedal functional operation can be notified in an intelligible manner. For example, in the case where the vehicle has stopped on a slope and there are no vehicles in front, the driver may be unable to grasp whether the vehicle is stationary. Due to the indicator indicating that the stopped state is being held by the one-pedal function, the driver is able to readily grasp that vehicle is stationary.

Configuration 2

The control apparatus according to configuration 1, characterized in that the travel controlling means is configured to further execute an auto brake hold function for holding the stopped state of the vehicle regardless of an operation amount of a brake pedal in a case where the vehicle has stopped in a state where the one-pedal function is disabled, and the second indicator is displayed on the display device at a time of the vehicle being stopped by the auto brake hold function.

According to this configuration, a screen can be effectively utilized.

Furthermore, since the mark indicating stop hold is the same mark, the driver is able to readily grasp that the stopped state of the vehicle is being held.

Configuration 3

The control apparatus according to configuration 1 or 2, characterized in that the travel controlling means determines that the vehicle has stopped based on a detection result of a wheel speed sensor (156) of the vehicle.

According to this configuration, the stopping of the vehicle can be accurately determined.

Configuration 4

The control apparatus according to any one of configurations 1 to 3, characterized in that the travel controlling means starts operation of an electric parking brake (142), in a case where a braking force of the one-pedal function drops while the vehicle is stopped by the braking force of the one-pedal function, and the output controlling means ends display of the second indicator, in a case where operation of the electric parking brake is completed.

According to this configuration, the driver is able to readily grasp the switch to holding by the electric parking brake.

Configuration 5

The control apparatus according to any one of configurations 1 to 4, characterized in that the output controlling means notifies an instruction to press the brake pedal (152) to the driver, in a case where the braking force of the one-pedal function drops while the vehicle is stopped by the braking force of the one-pedal function.

According to this configuration, the driver is able to readily grasp that the brake pedal needs to be pressed, and improvement in safety can be achieved.

Configuration 6

The control apparatus according to any one of configurations 1 to 5, characterized in that the output controlling means ends display of the second indicator at a point in time or a time slightly before the point in time at which it is estimated that a braking force and a propulsive force acting on the vehicle are balanced, while the one-pedal function is being executed and the vehicle is stopped on a downslope.

According to this configuration, the driver is able to accurately grasp the timing at which the vehicle starts moving.

Configuration 7

The control apparatus according to any one of configurations 1 to 5, characterized in that the output controlling means ends display of the second indicator in response to the accelerator pedal (150) being operated, while the one-pedal function is being executed and while the vehicle is stopped on a slope steeper than a threshold value or the vehicle is stopped in a state where the braking force of the one-pedal function is increased by the driver further pressing a brake pedal.

According to this configuration, a state where the vehicle starts moving while the stop hold indicator is on, during judgement processing by the travel control unit as to whether the stop hold state of the vehicle is being maintained can be inhibited, and the driver's sense of security can be enhanced.

Configuration 8

The control apparatus according to any one of configurations 1 to 7, characterized in that the output controlling means does not display the second indicator on the display device, in a case where a seatbelt (160) is unfastened while the one-pedal function is being executed and the vehicle is traveling, and the vehicle is stopped in this state.

According to this configuration, the driver can be inhibited from getting out of the vehicle.

Configuration 9

The control apparatus according to any one of configurations 1 to 8, characterized by comprising:

output controlling means for notifying an instruction to press a brake pedal to the driver, in a case where a seatbelt is unfastened while the one-pedal function is being executed and the vehicle is traveling, and the vehicle is stopped in the state.

According to this configuration, the driver can be inhibited from getting out of the vehicle without pressing the brake pedal.

Configuration 10

A control method for controlling a vehicle (100), the vehicle including travel controlling means (113) capable of executing a one-pedal function for controlling both a driving force and a braking force of the vehicle according to an operation amount of an accelerator pedal (150), the method characterized by comprising:

a step of displaying a first indicator (302) indicating that the one-pedal function is enabled on a display device (166) of the vehicle; and a step of displaying a second indicator (305) indicating that a stopped state of the vehicle is being held by a braking force of the one-pedal function on the display device.

According to this configuration, the state of the vehicle can be notified in an intelligible manner.

Configuration 11

A program for causing a computer to function as the control apparatus of any one of configurations 1 to 9.

According to this configuration, the present invention can be provided in the form of a program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A control apparatus for controlling a vehicle, the apparatus comprising:
   a travel controlling unit for executing a one-pedal function for controlling both a driving force and a braking force of the vehicle according to an operation amount of an accelerator pedal; and
   an output controlling unit capable of displaying, on a display device of the vehicle, a first indicator indicating that the one-pedal function is enabled and a second indicator indicating that a stopped state of the vehicle is being held by a braking force of the one-pedal function, wherein
   the travel controlling unit starts operation of an electric parking brake, in a case where a braking force of the one-pedal function drops while the vehicle is stopped by the braking force of the one-pedal function, and
   the output controlling unit ends display of the second indicator, in a case where operation of the electric parking brake is completed.

2. The control apparatus according to claim 1, wherein the travel controlling unit is configured to further execute an auto brake hold function for holding the stopped state of the vehicle regardless of an operation amount of a brake pedal in a case where the vehicle has stopped in a state where the one-pedal function is disabled, and
   the output controlling unit displays the second indicator on the display device at a time of the vehicle being stopped by the auto brake hold function.

3. The control apparatus according to claim 1, wherein the travel controlling unit determines that the vehicle has stopped based on a detection result of a wheel speed sensor of the vehicle.

4. The control apparatus according to claim 1, wherein the output controlling unit ends display of the second indicator at a point in time or slightly before the point in time at which it is estimated that a braking force and a propulsive force acting on the vehicle are balanced, while the one-pedal function is being executed and the vehicle is stopped on a downslope.

5. The control apparatus according to claim 1, wherein the output controlling unit ends display of the second indicator in response to the accelerator pedal being operated, while the one-pedal function is being executed and while the vehicle is stopped on a slope steeper than a threshold value or the vehicle is stopped in a state where the braking force of the one-pedal function has increased by the driver further pressing a brake pedal.

6. The control apparatus according to claim 1, wherein the output controlling unit does not display the second indicator on the display device, in a case where a seatbelt is unfastened while the one-pedal function is being executed and the vehicle is traveling, and the vehicle is stopped in this state.

7. The control apparatus according to claim 1, further comprising:
   an output controlling unit configured to notify an instruction to press a brake pedal to the driver, in a case where a seatbelt is unfastened while the one-pedal function is being executed and the vehicle is traveling, and the vehicle is stopped in this state.

8. A control apparatus for controlling a vehicle, the apparatus comprising:
   a travel controlling unit for executing a one-pedal function for controlling both a driving force and a braking force of the vehicle according to an operation amount of an accelerator pedal; and
   an output controlling unit capable of displaying, on a display device of the vehicle, a first indicator indicating that the one-pedal function is enabled and a second indicator indicating that a stopped state of the vehicle is being held by a braking force of the one-pedal function,
   wherein the output controlling unit notifies an instruction to press the brake pedal to the driver, in a case where the braking force of the one-pedal function drops while the vehicle is stopped by the braking force of the one-pedal function.

9. A method for controlling a vehicle, the vehicle including a travel controller capable of executing a one-pedal function for controlling both a driving force and a braking force of the vehicle according to an operation amount of an accelerator pedal, the method comprising:
   displaying, on a display device of the vehicle, a first indicator indicating that the one-pedal function is enabled; and
   displaying, on the display device, a second indicator indicating that a stopped state of the vehicle is being held by a braking force of the one-pedal function, and
   the method further comprising:
   starting operation of an electric parking brake, in response to the determination that a braking force of the one-pedal function drops while the vehicle is stopped by the braking force of the one-pedal function and ending display of the second indicator, in response to the determination that operation of the electric parking brake is completed, or
   notifying an instruction to press the brake pedal to the driver, in response to the determination that the braking force of the one-pedal function drops while the vehicle is stopped by the braking force of the one-pedal function.

10. A non-transitory storage medium for storing a program for causing a computer to perform the method according to claim 9.

* * * * *